Feb. 6, 1934.  W. M. CHARMAN  1,945,880
HOT TOP
Filed April 13, 1931  2 Sheets-Sheet 1
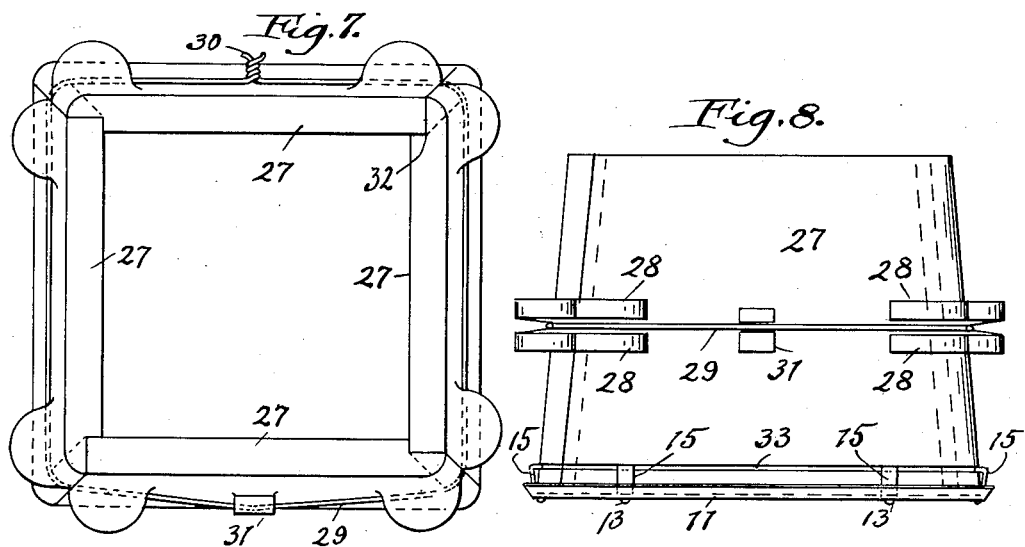
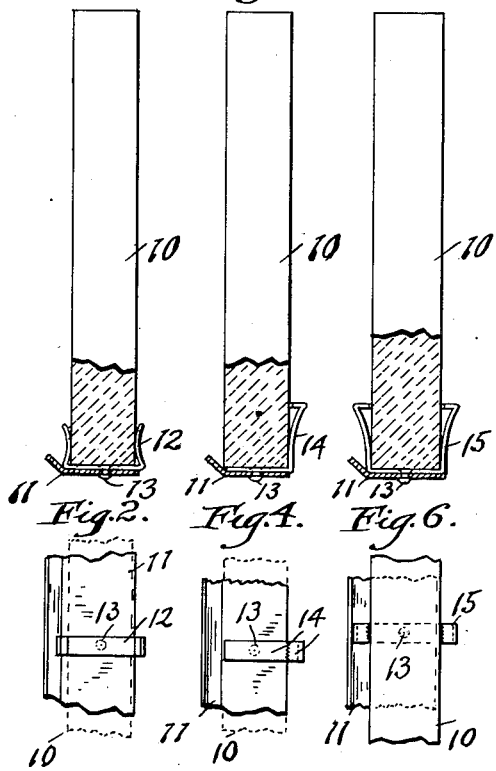
Inventor
Walter M. Charman.
Knox Hudson & Kent
attys.

Feb. 6, 1934. W. M. CHARMAN 1,945,880
HOT TOP
Filed April 13, 1931 2 Sheets-Sheet 2
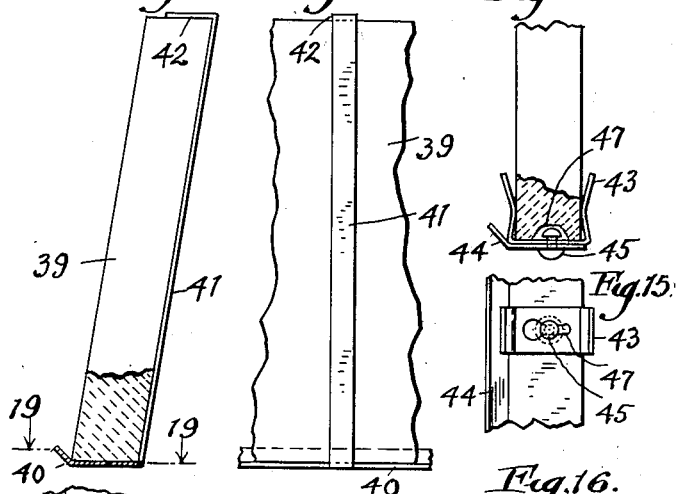
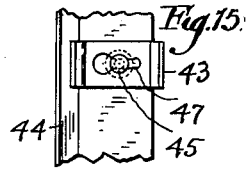
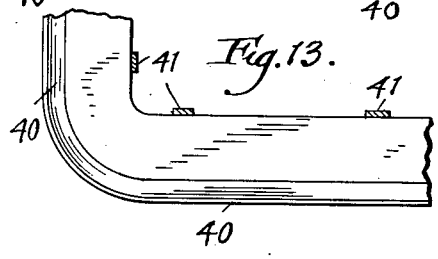
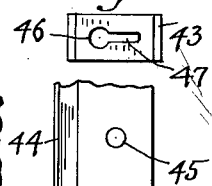
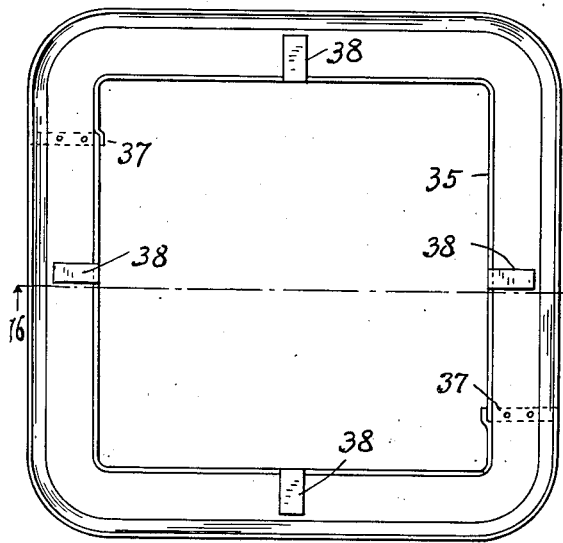
Inventor.
Walter M. Charman.
Kwis Hudson & Kent
attys Patented Feb. 6, 1934

1,945,880

UNITED STATES PATENT OFFICE 1,945,880

HOT TOP

Walter M. Charman, Cleveland Heights, Ohio

Application April 13, 1931. Serial No. 529,611

4 Claims. (Cl. 22—147)

This invention relates to improvements in hot tops for ingot molds, and relates particularly to molded or extruded non-metallic hot tops with metallic wiper strips attached thereto, said strips being separable from the non-metallic portion of the hot top when the latter is stripped from the ingot.

One of the objects of the invention is the provision of a hot top of relatively low first cost, wherein the flow of metal upwardly around the exterior of the hot top is prevented.

Another object is the provision of special wiper strip constructions adaptable for use upon baked clay or other molded or extruded non-metallic hot tops, whether made in a single piece or in a plurality of pieces attached together.

A further object is the provision of special means for attaching the wiper strip or strips to the non-metallic wall portions of the hot top.

Other objects and features of novelty will appear as I proceed with the description of those embodiments of the invention which, for the purposes of the present application, I have illustrated in the accompanying drawings, in which Figure 1 is a vertical section through one wall of a non-metallic hot top embodying the invention.

Fig. 2 is a fragmental plan view of the wiper strip and attaching clip shown in Fig. 1.

Figs. 3 and 4 and Figs. 5 and 6 are views similar to Figs. 1 and 2, showing modified forms of the invention.

Fig. 7 is a plan view of a sectional molded non-metallic hot top in which the invention is incorporated.

Fig. 8 is an elevational view of the same.

Fig. 9 is a plan view similar to Fig. 7, showing a one-piece, non-metallic hot top with a combined metal lining and wiper strip mounted thereupon.

Fig. 10 is a vertical sectional view of the same, taken substantially on the line 16—16 of Fig. 9.

Fig. 11 is a vertical sectional view through a side of an upwardly tapering hot top comprising a non-metallic wall portion and a sheet metal wiper strip held in position by long straps extending upwardly within the hot top and bent over against the upper edge thereof.

Fig. 12 is a fragmental elevational view of the same looking at the inner side of the hot top.

Fig. 13 is a plan view of the wiper strip of Figs. 11 and 12 with the retaining straps shown in section, the section being taken substantially on the line 19—19 of Fig. 11.

Fig. 14 is a fragmental vertical sectional view through a side of a hot top showing a detachable fastening between the wiper strip and an attaching clip.

Fig. 15 is a fragmental plan view of the wiper strip and attaching means shown in Fig. 14.

Fig. 16 is a plan view of the attaching clip of Fig. 14.

Fig. 17 is a fragmental plan view of the wiper strip of the same figure.

In Figs. 1 to 6 inclusive there are represented a number of hot top wall portions made of non-metallic materials, fitted with wiper strips and having different means for securing the same in place. The phrase "non-metallic material" used herein may include clay or similar material baked hard by subjection to high heat, it may include molded material that hardens by exposure to the air, or it may include material that is rendered strong by subjection to heavy pressure. In some cases the hot top may be molded in one or a plurality of sections, and in others the non-metallic material may be extruded, as is done in the manufacture of clay tiles, and cut to length.

In Figs. 1 to 6 inclusive the wall portion of non-metallic material is marked 10 and the wiper strip is marked 11. It may extend in one piece entirely around the perimeter of the hot top, or it may be made in a plurality of sections. In either case the wiper strip is separably secured to the hot top by means of clips attached to the wiper strip at intervals. In Figs. 1 and 2 these clips are shown at 12, and have bowed fingers which resiliently grip the hot top wall on both sides thereof, each clip being attached to the wiper strip by a rivet 13 or other suitable means. In Figs. 3 and 4 the clip 14 has a single gripping finger on the inner side of the wall portion, the upper end of the finger being bent inwardly and provided with serrations to bite into the wall portion of the hot top. In Figs. 5 and 6 the clip 15 is the same as clip 14 except that it has an outer gripping finger as well as an inner one. When the wiper strip is assembled upon the hot top this is accomplished by merely pushing upwardly into place the clips which have previously been attached to the wiper strip. The wiper strips can then of course be pulled off, but not without some effort, and they hold well during any necessary handling of the hot tops and the positioning of the same within the mold.

Where the walls of the hot top are straight rather than tapered and of the same cross section throughout, the material may be extruded and cut into proper lengths by the use of methods and apparatus known in the manufacture of tiles. Where the walls of the hot top are tapered however it is necessary to mold the wall portions either in one or a plurality of sections. In Figs. 7 and 8 a hot top of four molded wall sections 27 is illustrated. At points about half-way up the wall of each section, and at either edge thereof, there are provided pairs of outwardly protruding bosses 28, the bosses of each pair being spaced apart slightly so as to conveniently receive a wire 29 by means of which the various sections are bound together. The ends of the wire are twisted together as shown at 30, and the wire may be further stretched by means of a wedge 31 driven between it and the adjacent wall. Each of the wall sections 27 is rabbeted at one end as shown at 32 in order to receive the other end of the adjacent wall section. This detail construction of the hot top in a plurality of sections is known in the art, and hence in itself forms no part of the present invention. While any of the wiper strips illustrated in Figs. 1 to 6 inclusive and any of the attaching means shown in the same figures might be applied to the hot top of Figs. 7 and 8, the wiper strip and attaching means which I have illustrated is substantially that shown in Figs. 5 and 6. However, in Figs. 7 and 8, I have formed a narrow groove 33 in each section 27 near the lower end thereof for the reception of the upper ends of the clips 15, so that it is not necessary to form these clips with teeth, as is done in Figs. 5 and 6.

The form of the invention illustrated in Figs. 9 and 10 comprises a non-metallic wall portion 34, which may be made in one section or in a plurality of sections. The inner surface of this wall portion is covered with a sheet metal lining 35 which is bent outwardly at its lower end beneath the lower edge of the wall portion 34 to form a wiper strip 36. The lining 35 may conveniently be made in two parts which have welded or riveted joints indicated at 37 in Fig. 9. The lining is provided at its upper edge with a plurality of tabs 38 which are bent over against the upper edge of the hot top wall when the lining is assembled upon the non-metallic side wall portion.

In Figs. 11, 12 and 13 a somewhat similar construction is illustrated, but in this case the non-metallic side wall portion 39 is shown tapered, and the wiper strip 40 is held in place by metal straps 41 which extend upwardly along the inner surfaces of the side wall portions and are bent over at 42 against the upper edges of the wall portions. The straps 41 may be made integral with the wiper strip 40, but they are preferably cut from strap metal and attached to the wiper strip by any suitable means.

In Figs. 14 to 17 inclusive I have shown a clip 43, similar to the clips shown in Figs. 1 and 2, but attached to the wiper strip 44 in a different manner. At intervals throughout the length of the wiper strip 44 I mount studs 45, the upper heads of which are spaced above the upper surface of the wiper strip. Keyhole slots 46 are formed in the clips 43. The upper heads of the studs 45 may be inserted through the round portions of the slots 46, after which the clips 43 may be shifted so as to cause the narrow parts of the slots 46 to receive the studs. When the clips 43 carrying the wiper strip have been pushed onto the walls of the hot top, movement of the clips relative to the wiper strips is impossible, and the wiper strip is therefore securely mounted. In order to provide space for the upper ends of the studs 45 it may be necessary to chip away portions of the non-metallic side wall, as indicated at 47.

In all of the forms of the invention above described the wiper strip will adhere to the ingot when the hot top is stripped therefrom, being welded thereto by the heat of the molten metal. In most cases the non-metallic portion of the hot top will be destroyed in the stripping operation, although in some of the forms illustrated, particularly those shown in Figs. 9 and 10 and 7 and 8 it may be possible to utilize the non-metallic body of the hot top more than once.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a hot top, a non-metallic side wall portion, a metallic wiper strip extending outwardly from the lower end of the side wall portion throughout its perimeter, and means carried by said strip adapted to grip said side wall portion when the wiper strip is pushed into place thereon.

2. In a hot top, a non-metallic side wall portion, a metallic wiper strip extending outwardly from the lower end of the side wall portion throughout its perimeter, and spring fingers carried by said strip adapted to grip said side wall portion when the wiper strip is pushed into place thereon.

3. In a hot top, a non-metallic side wall portion, a metallic wiper strip extending outwardly from the lower end of the side wall portion throughout its perimeter, and metallic straps extending from said wiper strip upwardly within the hot top and bent outwardly over the upper edge of the wall thereof for holding the wiper strip in position.

4. In a hot top, a non-metallic side wall portion, a metallic wiper strip extending outwardly from the lower end of the side wall portion throughout its perimeter, and fingers carried by said strip extended upwardly along the inner surface of the side wall and adapted to grip the wall for holding the wiper strip in position.

WALTER M. CHARMAN